(12) United States Patent
Kim (10) Patent No.: US 6,580,312 B1
(45) Date of Patent: Jun. 17, 2003

(54) APPARATUS FOR GENERATING STABLE HIGH VOLTAGE SIGNAL

(75) Inventor: Jung-Hwan Kim, Kyoungki-Do (KR)

(73) Assignee: Hynix Semiconductor (KR)

( * ) Notice: Subject to any disclaimer, the term of this patent is extended or adjusted under 35 U.S.C. 154(b) by 0 days.

(21) Appl. No.: 09/698,939

(22) Filed: Oct. 27, 2000

(30) Foreign Application Priority Data

Oct. 30, 1999 (KR) ........................................ 1999-47703

(51) Int. Cl.$^7$ ................................................. G05F 1/10
(52) U.S. Cl. ...................................... 327/536; 327/537
(58) Field of Search ................................. 327/534, 535, 327/536, 537

(56) References Cited

U.S. PATENT DOCUMENTS

| | | | | |
|---|---|---|---|---|
| 4,471,290 A | * | 9/1984 | Yamaguchi | 323/274 |
| 5,202,587 A | * | 4/1993 | McLaury | 327/50 |
| 5,408,140 A | * | 4/1995 | Kawai et al. | 327/534 |
| 6,104,234 A | * | 8/2000 | Shin et al. | 327/534 |
| 6,265,932 B1 | * | 7/2001 | Miyawaki | 327/535 |

* cited by examiner

*Primary Examiner*—Terry D. Cunningham
(74) *Attorney, Agent, or Firm*—Townsend and Townsend and Crew LLP (57) ABSTRACT

A high voltage generation circuit generates a stable high voltage signal by selectively changing a delay time according to a voltage level of an external power signal. In the high voltage generation circuit, a voltage pump unit increases a voltage level of an external power signal in response to a control signal. A level detection unit detects a voltage level of the high voltage signal and delays the high voltage signal for a predetermined delay time to generate a high voltage enable signal, wherein the predetermined delay time is determined according to a voltage level of the external power signal. An oscillation unit performs an oscillating operation in response to the high voltage enable signal and generating an oscillation signal. A control signal generation unit generates the control signal in response to the oscillation signal.

21 Claims, 6 Drawing Sheets

APPARATUS FOR GENERATING STABLE HIGH VOLTAGE SIGNAL

BACKGROUND OF THE INVENTION

1. Field of the Invention

The present invention relates to a semiconductor device for use in a semiconductor memory device; and, more particularly, to an apparatus for generating a stable high voltage signal by selectively changing a delay time according to a voltage level for an external power signal.

2. Description of the Prior Art

In a typical semiconductor memory device, a high voltage signal is used for compensating a voltage loss caused due to threshold voltages of metal oxide semiconductor (MOS) transistors. The high voltage signal has a voltage level higher than an external power signal. A semiconductor device for generating the high voltage signal is called a high voltage generation circuit.

Since the high voltage signal can compensate for the voltage loss, the high voltage generation circuits are widely used in a word line drive circuit, a bit line isolation circuit, a data output buffer circuit, and the like.

Figure 1:
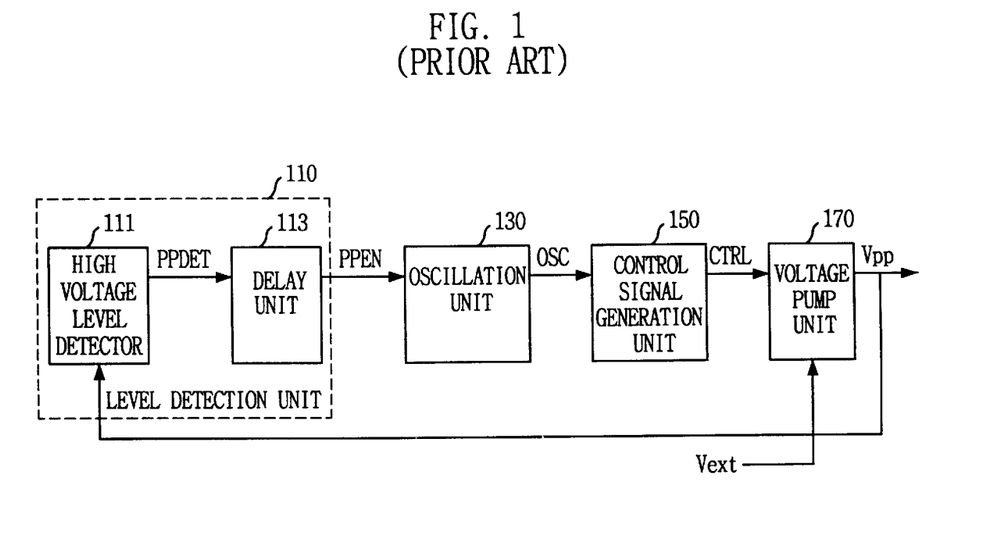
FIG. 1 is a block diagram showing a conventional high voltage generation circuit.

FIG. 1 is a block diagram showing a conventional high voltage generation circuit.

Referring to FIG. 1, a conventional high voltage generation circuit includes a level detection unit 110, an oscillation unit 130, a control signal generation unit 150 and a voltage pump unit 170.

The level detection unit 110 detects a voltage level of a high voltage signal Vpp to generate a high voltage enable signal PPEN. The level detection unit 110 includes a high voltage level detector 111 and a delay unit 113. The high voltage level detector 111 detects the voltage level of the high voltage signal Vpp to generate a high voltage detection signal PPDET. Here, the high voltage detection signal PPDET is a signal that is activated when the high voltage signal Vpp becomes higher than a target voltage level. The delay unit 113 delays the high voltage detection signal PPDET for a predetermined time to generate the high voltage enable signal PPEN.

The oscillation unit 130 generates an oscillation signal OSC in response to the high voltage enable signal PPEN. That is, if the high voltage signal Vpp reaches the target voltage level, the high voltage enable signal PPEN is activated to a high level so that the oscillation unit 130 stops an oscillating operation. If the high voltage signal Vpp becomes less than the target voltage level, the high voltage enable signal PPEN is inactivated to a low level so that the oscillation unit 130 starts the oscillating operation.

The control signal generation unit 150 generates a control signal CTRL in response to the oscillation signal OSC.

The voltage pump unit 170 increases a voltage level of the external power signal Vext through a pumping operation in response to the control signal CTRL, to thereby generate the high voltage signal Vpp. Here, the high voltage signal Vpp is feedback to the level detection unit 110.

Figure 2:
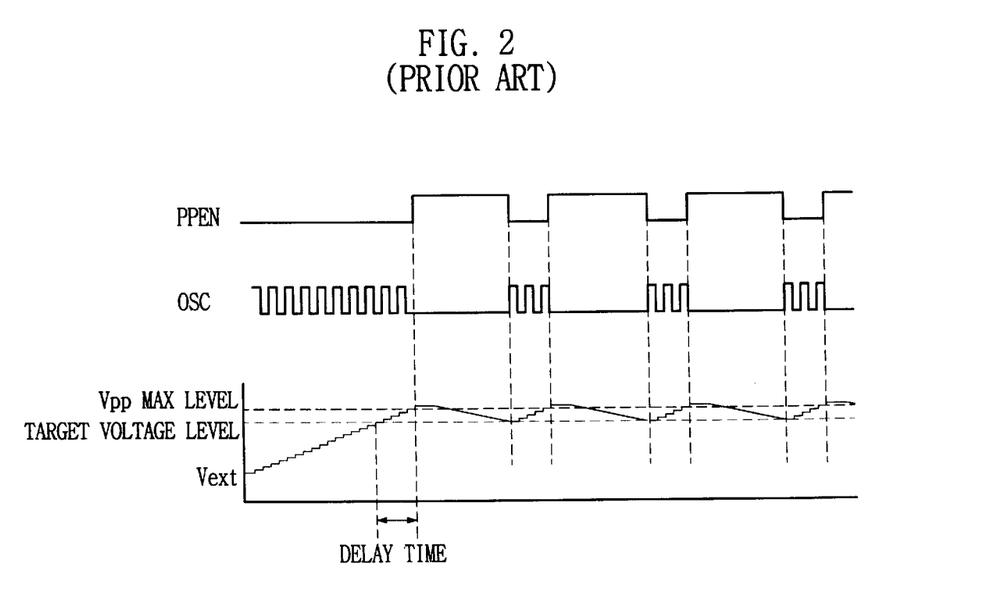
FIG. 2 is a timing chart for explaining an operation of a conventional high voltage generation circuit shown in FIG. 1.

FIG. 2 is a timing chart for explaining an operation of a conventional high voltage generation circuit.

Referring to FIG. 2, if the external power signal Vext reaches the target voltage level, the high voltage detection signal is activated to a high level, and, after a predetermined delay time, the high voltage enable signal PPEN is activated to a high level. The oscillation signal OSC is disabled to a low level so that the voltage pump unit 170 stops the pumping operation. As a result, the voltage level of the high voltage signal Vpp gradually decreases.

Then, if the voltage level of the high voltage signal Vpp becomes less than the target voltage level, the high voltage enable signal PPEN is inactivated to a low level, thereby starting the oscillation unit 130. As a result, the voltage pump unit 170 performs the pumping operation so that the voltage level of the high voltage signal Vpp is gradually increased.

However, since the delay unit 113 has a fixed delay time, the voltage pump unit 170 increases the voltage level of the high voltage signal Vpp as much as a predetermined voltage level without any consideration of the voltage level of the external power signal Vext. Thus, even when the external power signal Vext has a relatively high level, the voltage pump unit 170 performs the pumping operation for a period corresponding to the delay time that is determined by the delay unit 113. As a result, the high voltage signal Vpp is increased to an extremely high voltage level. Therefore, a reliability of the semiconductor device is degraded and an erroneous operation may be caused.

BRIEF SUMMARY OF THE INVENTION

It is, therefore, an object of the present invention to provide an apparatus for generating a stable high voltage signal by selectively changing a delay time according to a voltage level of an external power signal.

In accordance with an aspect of the present invention, there is provided an apparatus for generating a high voltage signal, comprising: a voltage pump means for increasing a voltage level of an external power signal in response to a control signal; a level detection means for detecting a voltage level of the high voltage signal and delaying the high voltage signal for a predetermined delay time to generate a high voltage enable signal, wherein the predetermined delay time is determined according to a voltage level of the external power signal; an oscillation means for performing an oscillating operation in response to the high voltage enable signal and generating an oscillation signal; and a control signal generation means for generating the control signal in response to the oscillation signal.

The level detection means includes: a high voltage level detection means for detecting the high voltage signal and generating a high voltage detection signal when the voltage level of the high voltage becomes higher than a predetermined target voltage level; an external power level detection means for detecting the external voltage signal and generating an external voltage detection signal when the voltage level of the external voltage level becomes less than a predetermined voltage level; and a delay means for delaying the high voltage detection signal for the predetermined delay time according to the external power detection signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 3:
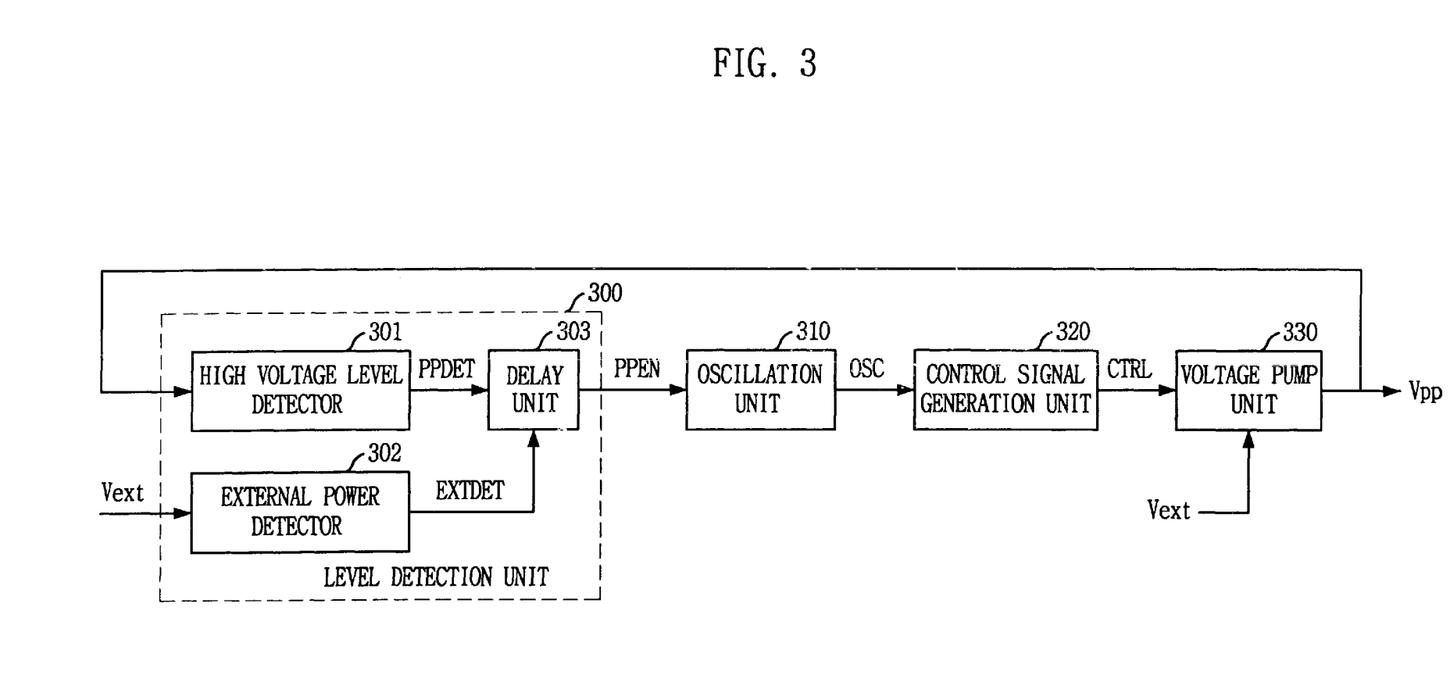
FIG. 3 is a block diagram illustrating a high voltage generation circuit in accordance with the present invention.

FIG. 3 is a block diagram illustrating a high voltage generation circuit in accordance with the present invention.

Referring to FIG. 3, a high voltage generation circuit in accordance with the present invention includes a level detection unit 300, an oscillation unit 310, a control signal generation unit 320 and a voltage pump unit 330.

The level detection unit 300 receives a high voltage signal Vpp and an external power signal Vext to generate a high voltage enable signal PPEN. The level detection unit 300 includes a high voltage level detector 301, an external power level detector 302 and a delay unit 303.

The high voltage level detector 301 detects a voltage level of the high voltage signal Vpp and generates a high voltage detection signal PPDET. The high voltage detection signal PPDET is a signal that is activated when the voltage level of the high voltage signal Vpp becomes higher than a target voltage level.

The external power level detector 302 detects a voltage level of the external power signal Vext and generates an external power detection signal EXTDET. The external power detection signal EXTDET is a control signal that is activated when the voltage level of the external power signal Vext becomes higher than a predetermined level.

The delay unit 303 delays the high voltage detection signal PPDET for a predetermined delay time in response to the external power detection signal EXTDET and generates a high voltage enable signal PPEN. The delay unit 303 selectively changes the delay time according to the voltage level of the external voltage signal Vext. That is, if the voltage level of the external power signal Vext is relatively high, the delay unit 303 delays the high voltage detection signal PPDET for a relatively short time. On the contrary, if the voltage level of the external power signal Vext is relatively low, the delay unit 303 delays the high voltage detection signal PPDET for a relatively long time.

The oscillation unit 310 performs an oscillating operation in response to the high voltage enable signal PPEN and generates an oscillation signal OSC.

The control signal generation unit 320 generates a control signal CTRL in response to the oscillation signal OSC.

The voltage pump unit 330 increases the voltage level of the external power signal Vext through a pumping operation in response to the control signal CTRL, thereby generating the high voltage signal Vpp. Here, the output high voltage signal Vpp from the voltage pump unit 330 is fed back to the level detection unit 300.

Figure 4:
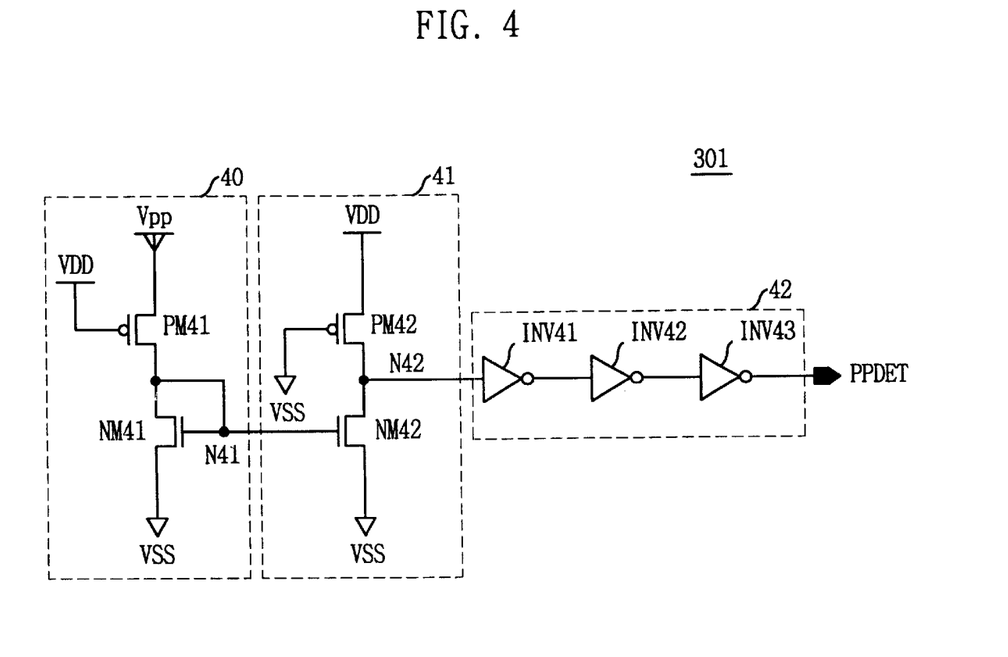
FIG. 4 is a circuit diagram illustrating a high voltage level detector shown in FIG. 3.

FIG. 4 is a circuit diagram illustrating the high voltage level detector 301 shown in FIG. 3.

Referring to FIG. 4, the high voltage level detector 301 includes a first transfer unit 40, a second transfer unit 41 and an inversion/buffer unit 42.

The first transfer unit 40 includes a PMOS transistor PM41 coupled between the high voltage signal Vpp and a first node N41, whose gate receives a power potential VDD, and an NMOS transistor NM41 coupled between the node N41 and a ground potential VSS, whose gate receives a voltage level of the node N41.

The second transfer unit 41 includes a PMOS transistor PM42 coupled between the power potential VDD and a node N42, whose gate receives the ground potential, an NMOS transistor NM42 coupled between the node N42 and the ground potential VSS, whose gate receives a voltage level of the node N41.

The inversion/buffer unit 42 includes a plurality of inverters INV41 to INV43 for inverting and buffering an output of the second transfer unit 41 to generate the high voltage enable signal PPDET.

Figure 5:
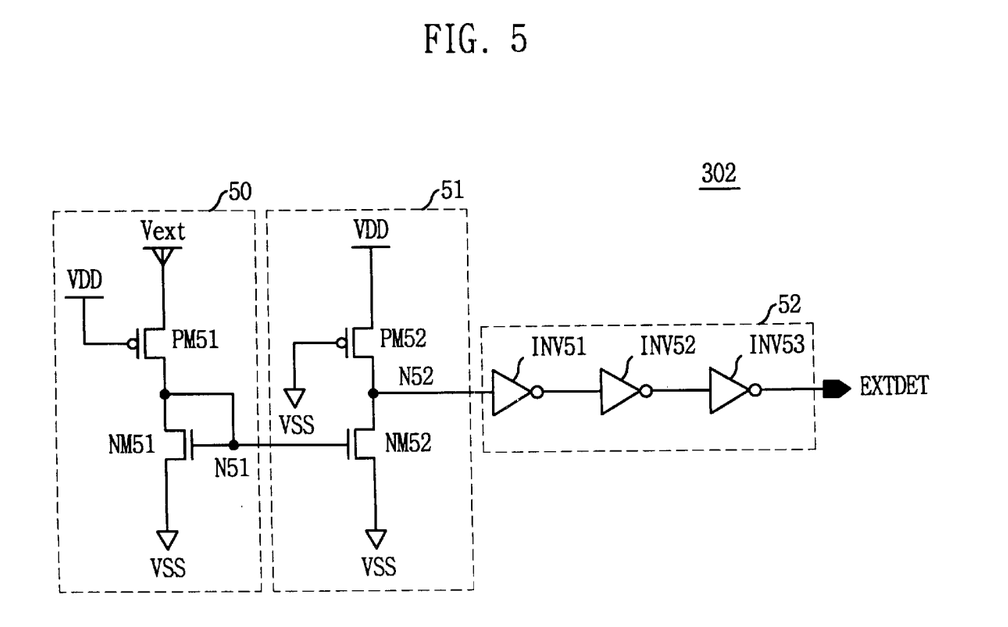
FIG. 5 is a circuit diagram illustrating an external power voltage level detector shown in FIG. 3.

FIG. 5 is a circuit diagram illustrating the external power level detector 302 as shown in FIG. 3.

Referring to FIG. 5, the external power level detector 302 includes a first transfer unit 50, a second transfer unit 51 and an inversion/buffer unit 52. The external power detector 302 has the same structure as the high voltage level detector 301, except that the external power signal Vext is used as an input instead of the high voltage signal Vpp.

That is, the first transfer unit 50 includes a PMOS transistor PM51 coupled between the external power signal Vext and a node N51, whose gate receives the power potential VDD, and an NMOS transistor NM51 coupled between the node N51 and a ground potential VSS, whose gate receives a voltage level of the node N51.

The second transfer unit 51 includes a PMOS transistor PM52 coupled between the power potential VDD and a node N52, whose gate receives the ground potential, an NMOS transistor NM52 coupled between the node N52 and the ground potential VSS, whose gate receives the voltage level of the node N51.

The inversion/buffer unit 52 includes a plurality of inverters INV51 to INV53 for inverting and buffering an output of the second transfer unit 51 to generate the external power detection signal EXTDET.

Figure 6:
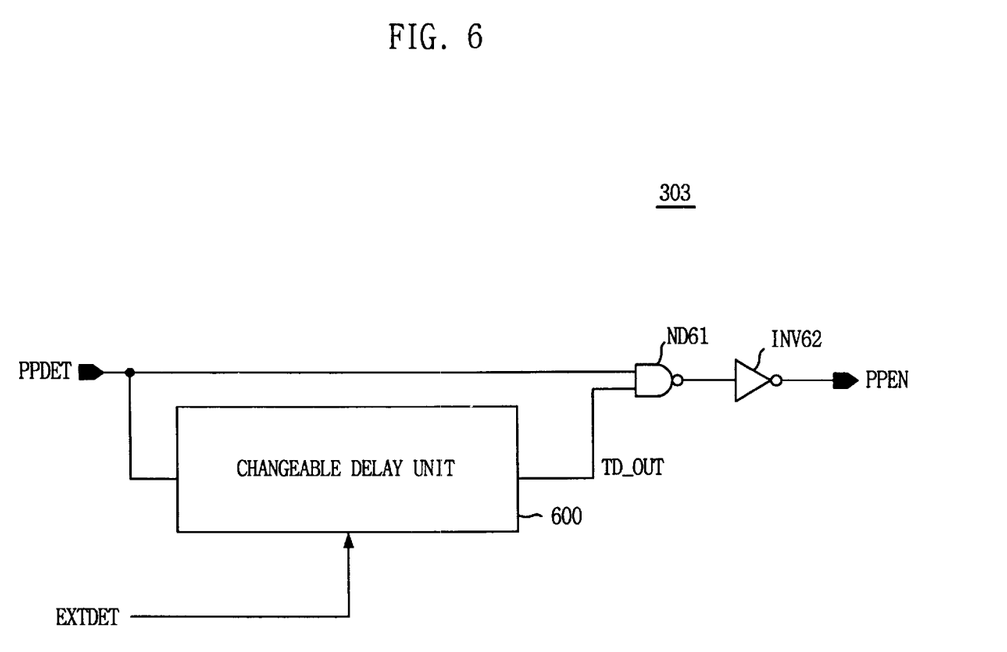
FIG. 6 is a schematic diagram illustrating a delay unit shown in FIG. 3.

FIG. 6 is a schematic diagram illustrating the delay unit 303 shown in FIG. 3.

Referring to FIG. 6, the delay unit 303 includes a changeable delay unit 600, a NAND gate ND61 and an inverter INV62.

The changeable delay unit 600 delays the high voltage detection signal PPDET for a predetermined delay time in response to the external power detection signal EXTDET to generate a delayed signal TD_OUT. The predetermined delay time is determined according to the external power detection signal EXTDET.

The NAND gate ND61 NANDs the high voltage detection signal PPDET and the delayed signal TD_OUT to generate a NANDed signal. The inverter INV62 inverts the NANDed signal to generate the high voltage enable signal PPEN.

Figure 7:
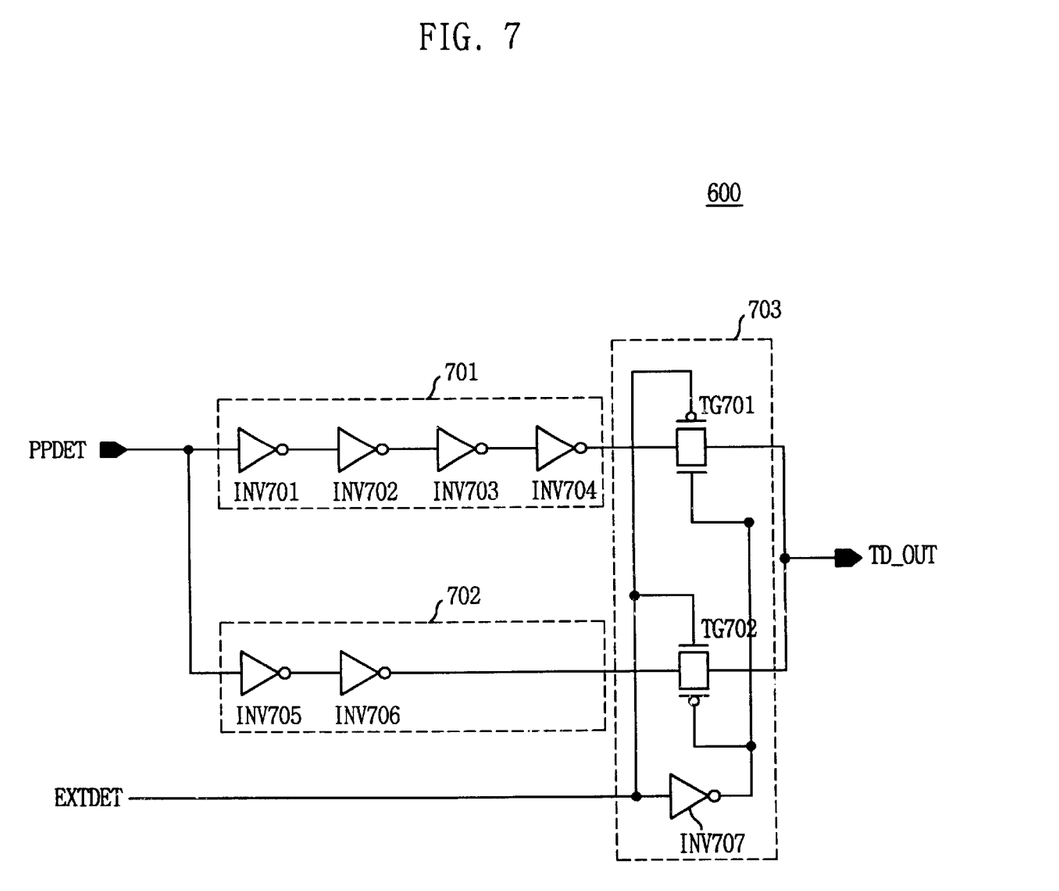
FIG. 7 is a circuit diagram illustrating a changeable delay unit shown in FIG. 6 as an embodiment of the present invention.

FIG. 7 is a circuit diagram illustrating the changeable delay unit 600 shown in FIG. 6 in accordance with an embodiment of the present invention.

Referring to FIG. 7, the changeable delay unit 600 in accordance with an embodiment of the present invention includes a first delay block 701, a second delay block 702, and a signal transfer block 703.

The first delay block 701 delays the high voltage detection signal PPDET for a first delay time to generate a first delayed high voltage detection signal.

The second delay block 702 delays the high voltage detection signal PPDET for a second delay time to generate a second delayed high voltage detection signal. In this embodiment, first delay block 701 has a delay time longer than the second delay block 702.

The signal transfer block 703 selectively outputs one of the first delayed high voltage detection signal and the second delayed high voltage detection signal as the delayed signal TD_OUT in response to the external power detection signal EXTDET.

The first and the second delay blocks 701, 702 can be implemented with a plurality of inverters coupled in series.

The signal transfer block 703 includes a first transmission gate TG701 for transferring the first delayed high voltage detection signal in response to the external power detection signal EXTDET, and a second transmission gate TG702 for transferring the second delayed high voltage detection signal in response to an inverted external power detection signal.

Hereinafter, an operation of the high voltage generation circuit in accordance with the present invention will be described with reference to FIGS. 3 to 7.

In the high voltage level detector 301 contained in the level detection unit 300, if the voltage level of the high voltage signal Vpp is gradually increased and becomes slightly higher than that of the power potential VDD, the PMOS transistor PM41 is turned on so that the NMOS transistor NM41 is turned on. However, since the NMOS transistor PM42 is slightly turned on and the PMOS transistor PM42 maintains a turned-on state, a voltage level of the node N42 becomes a high level. Therefore, the high voltage level detector 301 generates the high voltage detection signal PPDET of a low level via the inversion/buffer unit 42.

Meanwhile, if the voltage level of the high voltage signal Vpp is continuously increased and becomes much higher than the predetermined voltage level, the driving force of the PMOS transistor PM41 is also increased so that the voltage level of the node N41 becomes a high level. Thus, the NMOS transistor NM42 is also turned on in response to the voltage level of the node N41 so that the voltage level of the node N42 becomes a low level. As a result, the high voltage level detector 301 generates the high voltage detection signal PPDET of a high level via the inversion/buffer unit 42.

In similar manner, in the external power level detector 302, if a voltage level of the external power signal Vext is higher than a predetermined level, the external power level detector 302 generates the external power detection signal EXTDET of a high level. On the contrary, if the voltage level of the external power signal Vext is lower than that the predetermined level, the external power level detector 302 generates the external power detection signal EXTDET of a low level.

Then, the delay unit 303 delays the high voltage detection signal PPDET for a predetermined delay time, which is determined according to the external power detection signal EXTDET, thereby generating the high voltage enable signal PPEN.

That is, in the case where the voltage level of the external power signal Vext is low, the external power detection signal EXTDET becomes a low level. Therefore, the first delayed high voltage detection signal is generated as the delayed signal TD_OUT in response to the external power detection signal EXTDET. As a result, the voltage pump unit 330 performs the pumping operation for a relatively long time, so that the voltage level of the high voltage signal Vpp is increased to a relatively high level.

If the voltage level of the external power signal Vext is high, the external power detection signal EXTDET becomes a high level. Therefore, the second delayed high voltage detection signal is generated as the delayed signal TD_OUT. As a result, the voltage pump unit 330 performs the pumping operation for a relatively short time, so that the voltage level of the high voltage signal Vpp is increased just a little.

As described above, in the case where the voltage level of the external power signal Vext is high, the short delay time is selected, thereby preventing the high voltage signal Vpp from being increased to an extremely high level. Conversely, in the case where the voltage level of the external power signal Vext is low, the relatively long delay time is selected, thereby obtaining the high voltage signal Vpp with a sufficiently high level.

Figure 8:
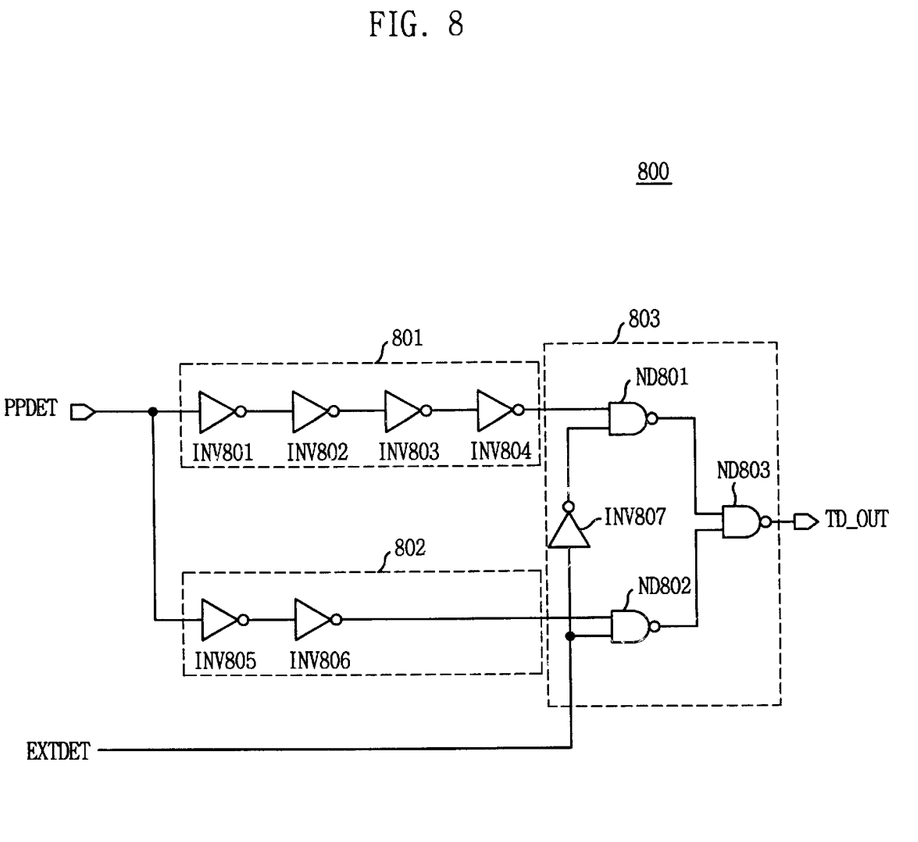
FIG. 8 is a circuit diagram illustrating a changeable delay unit shown in FIG. 6 as another embodiment of the present invention.

FIG. 8 is a circuit diagram illustrating a changeable delay unit 800 in accordance with another embodiment of the present invention.

Referring to FIG. 8, the changeable delay unit 800 in accordance with another embodiment of the present invention includes a first delay block 801, a second delay block 802 and a signal transfer block 803.

The first delay block 801 delays the high voltage detection signal PPDET for a first delay time to generate a first delayed high voltage detection signal, and the second delay block 802 delays the high voltage detection signal PPDET for a second delay time to generate a second delayed high voltage detection signal. In this embodiment, the first delay block 801 has a delay time longer than the second delay block 802.

The signal transfer block 803 selectively outputs one of the first delayed high voltage detection signal and the second delayed high voltage detection signal according to the external power detection signal EXTDET.

The first and the second delay blocks 801, 802 can be implemented with a plurality of inverters coupled in series.

The signal transfer block 803 includes a first NAND gate ND801 for NANDing the first delayed high voltage detection signal and an inverted external power detection signal, a second NAND gate ND802 for NANDing the second delayed high voltage detection signal and the external power detection signal EXTDET, and a third NAND gate ND803 for NANDing the output signals of the first and the second NAND gates ND801 and ND802 to generate the delayed signal TD_OUT.

Similarly, to FIG. 7, if the voltage level of the external power detection signal EXTDET is low, the first delayed high voltage detection signal that has a relative long delay time is provided as the delayed signal TD_OUT. If the voltage level of the external power detection signal EXTDET is high, the second delayed high voltage detection signal that has a relative short delay time is provided as the delayed signal TD_OUT.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a high voltage signal, comprising:

a voltage pump means for increasing a voltage level of an external power signal in response to a control signal, thereby generating the high voltage signal;

a level detection means for detecting a voltage level of the high voltage signal and generating a high voltage enable signal, wherein the level detection means includes:
   a high voltage level detection means for detecting the high voltage signal and generating a high voltage detection signal when the voltage level of the high voltage signal becomes higher than a predetermined target voltage level;
   an external power level detection means for detecting the external power signal and generating an external voltage detection signal when the voltage level of the external power signal becomes less than a predetermined voltage level; and
   a delay means for delaying the high voltage detection signal for a delay time determined at least in part from the external voltage detection signal;
an oscillation means for performing an oscillating operation in response to the high voltage enable signal and generating an oscillation signal; and
a control signal generation means for generating the control signal in response to the oscillation signal.

2. The apparatus as recited in claim 1, wherein, if the high voltage enable signal is activated to a high level, the oscillation signal is inactivated to a low level, so that the voltage pump means stops the pumping operation.

3. The apparatus as recited in claim 2, wherein the high voltage level detection means includes:
   a first PMOS transistor, coupled between the high voltage signal and a first node, whose gate receives a power potential;
   a first NMOS transistor, coupled between the first node and a ground potential, whose gate receives a voltage level of the first node;
   a second PMOS transistor, coupled between the power potential and a second node, whose gate is coupled to the ground potential;
   a second NMOS transistor, coupled between the second node and the ground potential, whose gate receives the voltage level of the first node;
   and a plurality of inverters, coupled in series, for inverting and buffering a voltage level of the second node to generate the high voltage detection signal.

4. The apparatus as recited in claim 2, wherein the external power level detection means includes:
   a first PMOS transistor, coupled between the external power signal and a first node, whose gate receives a power potential;
   a first NMOS transistor, coupled between the first node and a ground potential, whose gate receives a voltage level of the first node;
   a second PMOS transistor, coupled between the power potential and a second node, whose gate is coupled to the ground potential;
   a second NMOS transistor, coupled between the second node and the ground potential, whose gate receives the voltage level of the first node;
   and a plurality of inverters, coupled in series, for inverting the buffering a voltage level of the second node to generate the external power detection signal.

5. The apparatus as recited in claim 2, wherein the delay means includes:
   a changeable delay unit for delaying the high voltage detection signal according to the external voltage detection signal, to generate a delayed signal;
   a NAND gate for NANDing the high voltage detection signal and the delayed signal; and
   an inverter for inverting an output of the NAND gate to output the high voltage enable signal.

6. The apparatus as recited in claim 5, wherein the changeable delay unit includes:
   a first delay circuit for delaying the high voltage detection signal for a first delay time to generate a first delayed high voltage detection signal;
   a second delay circuit for delaying the high voltage detection signal for a second delay time to generate a second delayed high voltage detection signal, wherein the first delay time is longer than the second delay time; and
   a signal transfer circuit for selectively outputting one of the first delayed high voltage detection signal and the second delayed high voltage detection signal in response to the external power detection signal.

7. The apparatus as recited in claim 6, wherein the first delay circuit is implemented with a predetermined number of inverters coupled in series.

8. The apparatus as recited in claim 7, wherein the second delay circuit is implemented with a predetermined number of inverters coupled in series.

9. The apparatus as recited in claim 6, wherein the signal transfer circuit includes:
   a first transmission gate for transferring the first delayed high voltage detection signal in response to the external power detection signal; and
   a second transmission gate for transferring the second delayed high voltage detection signal in response to an inverted external power detection signal.

10. The apparatus as recited in claim 6, wherein the signal transfer circuit includes:
   a first NAND gate for NANDing the first delayed high voltage detection signal and an inverted external power detection signal;
   a second NAND gate for NANDing the second delayed high voltage detection signal and the external power detection signal; and
   a third NAND gate for NANDing an output of the first NAND gate and an output of the second NAND gate to generate the delayed signal.

11. A device for generating a high voltage signal, comprising:
   a voltage pump circuit configured to increase a voltage level of an external power signal in response to a pump control signal, thereby generating the high voltage signal;
   a first signal generating circuit including:
     a high voltage level detection circuit configured to generate a first control signal when the high voltage signal exceeds a first threshold voltage;
     an external power detection circuit configured to generate a second control signal when the voltage level of the external power signal is less than a second threshold voltage; and
     a delay circuit configured to delay the first control signal by a delay time selected in response to the second control signal, thereby generating a high voltage enable signal; and
   a second signal generating circuit configured to generate the pump control signal in response to the high voltage enable signal.

12. The device recited in claim 11, wherein:

the delay time is substantially equal to a first time interval when the external power signal is less than the second threshold voltage;

the delay time is substantially equal to a second time interval when the external power signal is greater than the second threshold voltage; and the first time interval is longer than the second time interval.

13. The device of claim 11, wherein the second signal generating circuit includes:

an oscillator circuit configured to perform oscillations in response to the high voltage enable signal; and a pump signal generation circuit configured to generate the pump control signal in response to an output signal from the oscillator circuit.

14. The device recited in claim 13, wherein upon the high voltage enable signal switching to an active state, the output signal from the oscillator circuit switches to an inactive state and the voltage pump circuit stops a pumping operation.

15. The device recited in claim 11, wherein the high voltage level detection circuit includes:

a first PMOS transistor having a first current flowing terminal coupled to the high voltage signal, a second current flowing terminal coupled to a first node, and a gate terminal coupled to receive a power potential;

a first NMOS transistor having a first current flowing terminal coupled to the first node, a second current flowing terminal coupled to a ground potential, and a gate terminal coupled to the first node;

a second PMOS transistor having a first current flowing terminal coupled to the power potential, a second current flowing terminal coupled to a second node, and a gate terminal coupled to the ground potential;

a second NMOS transistor having a first current flowing terminal coupled to the second node, a second current flowing terminal coupled to the ground potential, and a gate terminal coupled to the first node; and a plurality of inverters coupled in series between the second node and an output node, wherein the first control signal is generated at the output node.

16. The device recited in claim 11, wherein the external power detection circuit includes:

a first PMOS transistor having a first current flowing terminal coupled to the external power signal, a second current flowing terminal coupled to a first node, and a gate terminal coupled to receive a power potential;

a first NMOS transistor having a first current flowing terminal coupled to the first node, a second current flowing terminal coupled to a ground potential, and a gate terminal coupled to the first node;

a second PMOS transistor having a first current flowing terminal coupled to the power potential, a second current flowing terminal coupled to a second node, and a gate terminal coupled to the ground potential;

a second NMOS transistor having a first current flowing terminal coupled to the second node, a second current flowing terminal coupled to the ground potential, and a gate terminal coupled to the first node; and a plurality of inverters coupled in series between the second node and an output node, wherein the second control signal is generated at the output node.

17. The device recited in claim 11, wherein the delay circuit includes:

a first delay subcircuit configured to delay the first control signal by a first delay time, thereby generating a first delayed signal;

a second delay subcircuit configured to delay the first control signal by a second delay time, thereby generating a second delayed signal; and a signal transfer subcircuit configured to select one of the first delayed signal and the second delayed signal in response to the second control signal and to provide the selected signal at an output node.

18. The device recited in claim 17, wherein the delay circuit further includes:

a NAND subcircuit having a first input terminal coupled to an output terminal of the signal transfer subcircuit, a second input terminal coupled to receive the first control signal, and an output terminal; and an inverter having an input terminal coupled to the NAND subcircuit and an output terminal that provides the high voltage enable signal.

19. The device recited in claim 17, wherein the first delay subcircuit includes a first number of inverters coupled in series and the second delay subcircuit includes a second number of inverters coupled in series, the second number being different from the first number.

20. The device recited in claim 17, wherein the signal transfer subcircuit includes:

a first transmission gate having an input terminal coupled to receive the first delayed signal, a control terminal coupled to receive the second control signal, and an output terminal coupled to the output node; and a second transmission gate having an input terminal coupled to receive the second delayed signal, a control terminal coupled to receive an inverted second control signal, and an output terminal coupled to the output node.

21. The device recited in claim 17, wherein the signal transfer subcircuit includes:

a first NAND unit having a first input terminal coupled to receive the first delayed signal, a second input terminal coupled to receive the second control signal, and an output terminal;

a second NAND unit having a first input terminal coupled to receive the second delayed signal, a second input terminal coupled to receive an inverted second control signal, and an output terminal; and a third NAND unit having a first input terminal coupled to the output terminal of the first NAND gate, a second input terminal coupled to the output terminal of the second NAND gate, and an output terminal coupled to the output node.

* * * * *